Aug. 9, 1949.   L. H. SMITH ET AL   2,478,878
DEICING WING CONSTRUCTION
Filed July 1, 1944   3 Sheets-Sheet 1

Inventor
PERRY DODSON
L. H. SMITH
By Reynolds + Beach
Attorneys

Aug. 9, 1949.  L. H. SMITH ET AL  2,478,878
DEICING WING CONSTRUCTION
Filed July 1, 1944  3 Sheets-Sheet 2
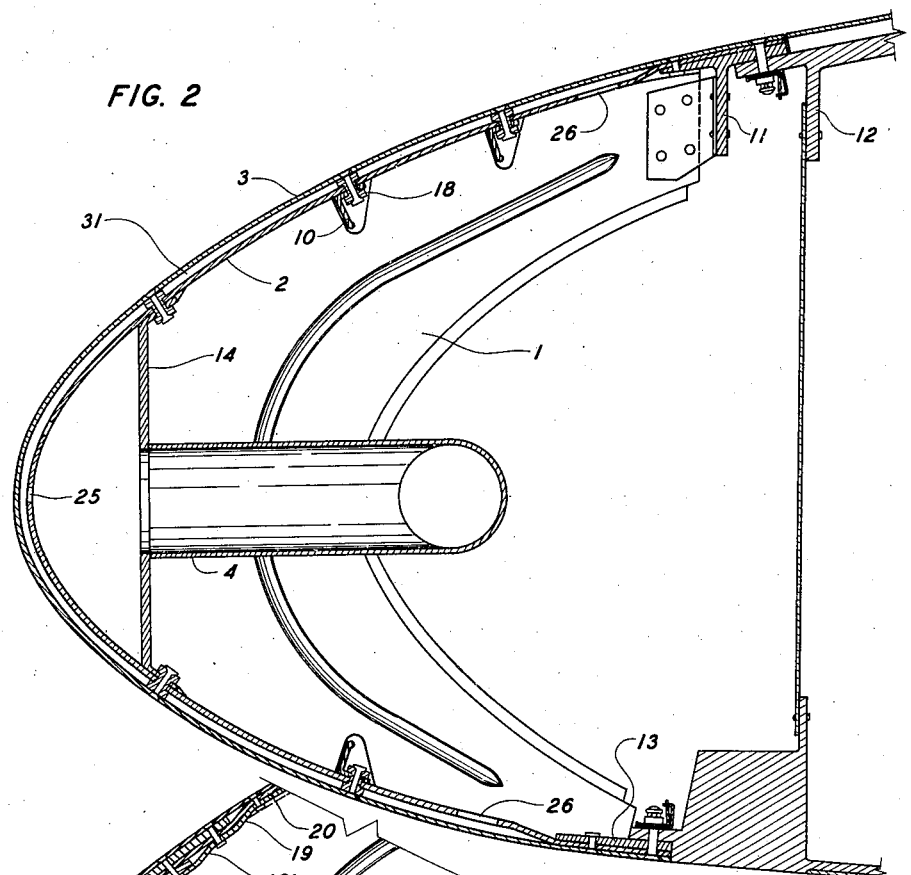
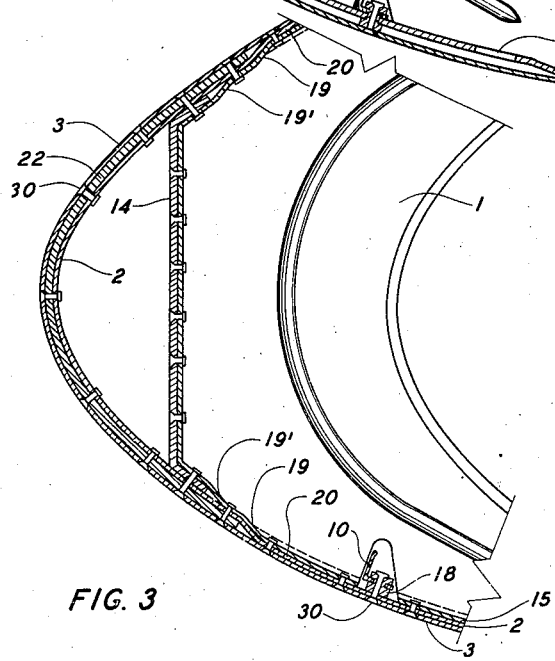
Inventor
PERRY DODSON
L. H. SMITH
By Reynolds & Beach
Attorneys Aug. 9, 1949.  L. H. SMITH ET AL  2,478,878
DEICING WING CONSTRUCTION Filed July 1, 1944  3 Sheets-Sheet 3

Inventor
PERRY DODSON
L. H. SMITH
By Reynolds & Beach
Attorneys

Patented Aug. 9, 1949

2,478,878

UNITED STATES PATENT OFFICE 2,478,878

DEICING WING CONSTRUCTION

Louis H. Smith, Wichita, Kans., and Perry A. Dodson, Seattle, Wash., assignors to Boeing Airplane Company, Seattle, Wash., a corporation of Delaware Application July 1, 1944, Serial No. 543,098

13 Claims. (Cl. 244—134)

Our invention relates to a deicing structure, particularly suitable for incorporation in the leading edge of an airplane wing.

It has been proposed heretofore to circulate hot gases through an airplane wing, either for the purpose of cooling such gases, or for warming the wing to prevent the formation of ice on it in flight or on the ground. The difficulty, however, with such previous proposals has been that the construction intended to accomplish this purpose has either been structurally inadequate, very difficult to fabricate, or inefficient as a heat transfer unit.

The principal object of our invention, therefore, is to provide an airplane wing structure, particularly suitable for the leading portion of such a wing, which can be constructed from preformed elements capable of being assembled easily. At the same time such construction is structurally efficient in that its strength will be adequate while its weight will not be excessive.

Another object of our invention is to provide such a construction which will constitute an effective heat exchange unit, affording intimate contact of the hot gas with the critical portions of the airplane wing, namely those upon which ice has the greatest tendency to collect. Moreover such arrangement establishes definite circulatory paths for such hot gas, so that not only will the heat be transferred most effectively from the gas to the wing structure, but the hotter gas will contact the portions of the airplane wing where the danger of ice formation is the greatest, which consequently dissipate the most heat.

Specifically it is an object to provide a warming chamber coextensive with the leading portion of the wing between the outer wing skin sheet and an inner sheet closely underlying the skin, both of which sheets are firmly and directly secured to the internal framework of the wing.

Additional objects which are more particularly inherent in the preferred construction and arrangement of the parts will be recognized in the description which follows. The various advantages of our invention may be secured despite changes in minor details which may be desirable for some installations.

Figure 2 is a transverse section through the portion of a wing shown in Figure 1, taken along line 2—2 of that figure. Figure 3 is a similar transverse sectional view on line 3—3 of Figure 1.

Figure 1:
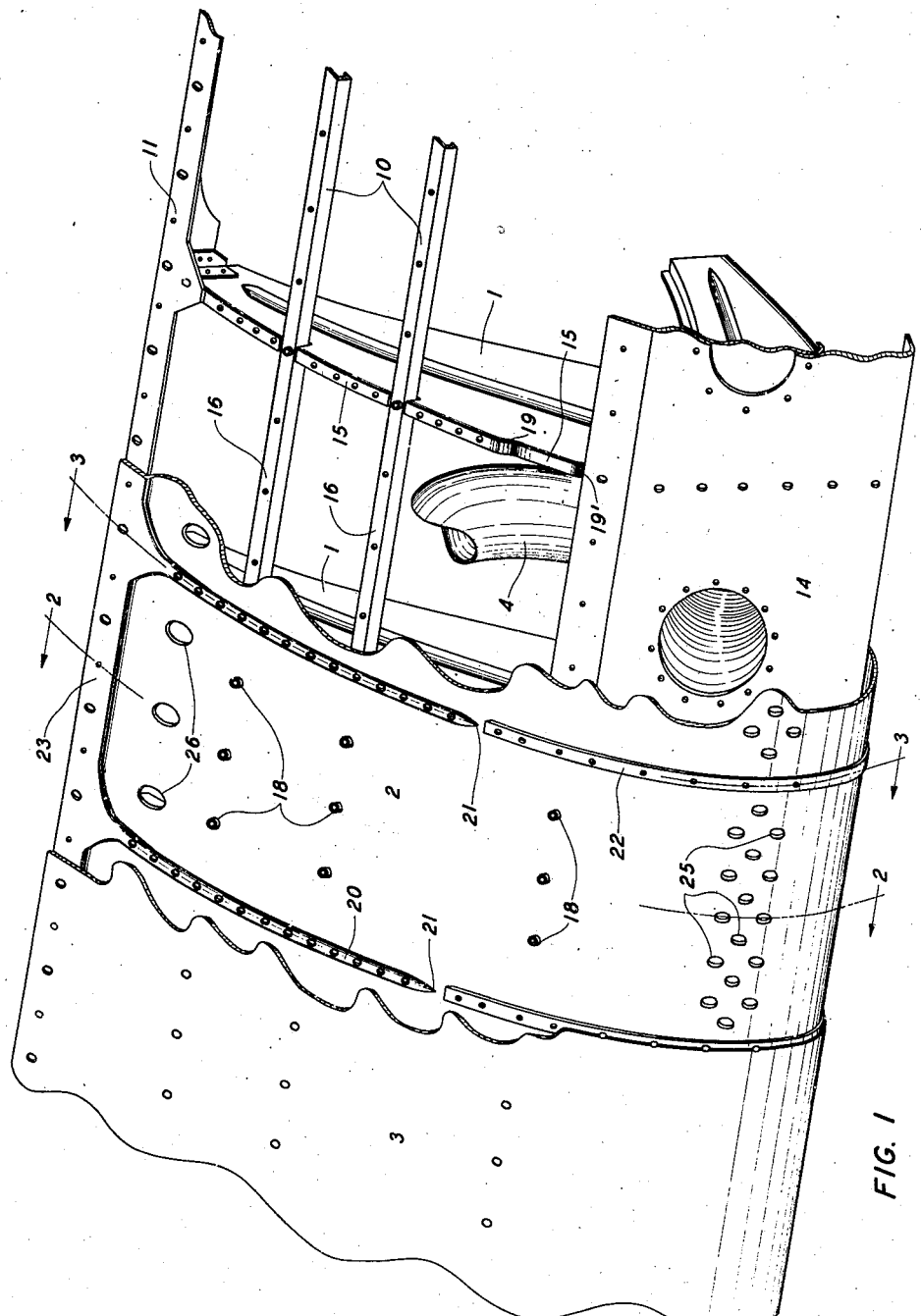
Figure 1 is a top perspective view of part of a wing constructed according to our invention, showing parts broken away to reveal the internal structure.

The leading portion of a large airplane wing is frequently formed as a separate unit to be attached to an after portion, such as an interspar section, subsequent to completion of its fabrication. Such a procedure is shown, for example, in Figure 1 of Delage Patent No. 1,854,330. Since this general type of construction is conventional practice we have illustrated our invention as embodied in such a structure, but it will be understood that its novel characteristics can be incorporated in a wing in which the leading edge portion is not separate from that immediately behind it. Where an airplane wing does incorporate a separate leading edge section our invention need be applied only to this unit, since there is comparatively little tendency for ice to collect on parts of the wing rearwardly of such leading portion.

In order to withstand the aerodynamic loads applied to the outer skin of an airplane wing, particularly over the leading portion, and to preserve its design airfoil contour, it is important that such skin be secured firmly to the structural skeleton of the wing, usually composed of rib members extending chordwise and stringers extending spanwise of the wing. On the other hand, the surface of the wing can be heated by the exhaust gas from the engine or other heating medium most effectively only if such medium is confined to a restricted space adjacent to the wing skin.

To stiffen the wing adequately the stringers of the wing framework should be of substantial depth perpendicular to the wing skin. Consequently a wall inwardly of such members forming with the wing skin and ribs a space within which to confine heating gases is inefficient because of the excessive width of such space between the skin of the wing and such inner wall. On the other hand, if the inner wall is placed outwardly of the wing skeleton grid, and the wing skin is merely spaced equidistantly from it, it is difficult to provide a structurally satisfactory connection between the skin and the framework. Moreover, in both of these types of construction it is difficult to control effectively circulation of the hot gas through the chamber formed by the wing skin and the inner wall.

The construction of our invention overcomes the above disadvantages, and further has the advantage that conventional wing assembly technique may be employed for the most part. Thus the grid framework of the wing, composed of formed sheet rib members 1 and interconnecting stringers 10, may be quite conventional with very minor exceptions. The ribs, of course, extend chordwise of the leading edge portion, and the stringers 10, preferably of angle shape, extending spanwise of the wing may be received in notches in the outer edges of the ribs and secured to them in conventional manner. The rearward ends of the ribs are interconnected by a suitable marginal member, such as the T-bar 11 apertured for pinned connection to a complemental T-bar 12 incorporated in the skeleton of the interspar wing section. The lower ends of the ribs may be interconnected by a similar T-bar, or by a flat bar 13, extending spanwise of the wing. It is not necessary, in most instances, for the wing ribs to extend clear to the nose, and their front ends may therefore be joined by a nose plate 14 of generally channel shape spaced rearward of the nose curve. In this instance such plate may form one wall of a header for conducting the hot gas to the wing skin warming chambers, as will be discussed hereafter.

It is customary to rivet the outer skin of the wing directly to flanges 15 integral with the upper and lower edges of the ribs, and with flanges 16 of the stringer angles 10. Such a structure, however, is not well adapted to the application of exhaust gas to the wing skin for warming it to prevent ice formation. On the contrary, it is desirable to form gas receiving chambers which are of slight thickness perpendicular to the wing skin. To provide such chambers, therefore, instead of applying the outer wing skin contiguously upon the flanges of the skeletal frame members, we interpose an under sheet 2 between the outer skin and such members, which under sheet is laid over and secured directly to the framework.

Between each pair of adjacent ribs 1 sheet 2 has upper and lower shallow drawn recesses, leaving upstanding ridges 20. It is preferred that these ridges terminate in ends 21 adjacent to the rounded nose of the wing, at locations approximately one-third of the width of the sheet 2 from each sheet edge. Such ribs stiffen the sheet, and consequently would hamper the operation of bending its central portion around the sharp leading edge curvature if they extended continuously across the width of the sheet. As a matter of fact, since the entire central portion of the sheet is planar prior to being applied to the leading edge of the wing, the ridges 20 and the margins 23 would actually be the parts drawn out of the original plane of the sheet. Extending between the ends 21 of each pair of corresponding upper and lower ridges 20, therefore, and disposed in the plane of such ridges, a spacing strip 22 of a thickness equal to the projection of these ridges is laid over sheet 2.

Figure 6:
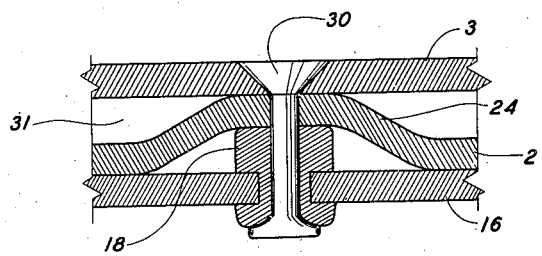
Figure 6 is a detail sectional view similar to Figure 5 showing an alternative type of rivet arrangement.

Since the ridges 20 of sheet 2 are located to overlie the several ribs 1, whereas the portions of this sheet intermediate such ridges will contact the flanges 16 of stringers 10, the rib flanges 15 and the stringer flanges 16 will not lie in the same curved surface. On the contrary, the rib flanges 15 should project beyond the surface defined by stringer flanges 16 a distance corresponding to the outward projection of ridges 20. At the junction of the stringers with ribs 1, therefore, a spacer rivet 18, as shown in Figure 3, is secured to each stringer flange. The thickness of the rivet head projecting outward from such flange is sufficient so that its outer end lies flush with the outer surface of the rib flange 15. A detail of such a spacer rivet is shown in Figure 6.

Because ridges 20 do not extend across the full width of the inner wall sheet 2 it is necessary to form an offset 19 in the flanges 15 of ribs 1 at a location corresponding to the ridge ends 21. When sheet 2 is laid on the wing skeleton, therefore, the outwardly projecting portions of ribs 1 will lodge in the grooves formed by the under sides of ridges 20 coinciding in location with the rib disposition. Between the rib flange offsets 19 the undeformed portions of sheet 2 forward to a point adjacent to nose plate 14 will engage contiguously the nose portions of the rib flanges.

Adjacent to the edges of the rearwardly extending flanges on nose plate 14 the rib flanges 15 have additional upper and lower inward offsets 19', corresponding to the thickness of the nose plate flanges. The outer surfaces of such flanges will therefore lie in continuation of the contours of the rib flanges 15 between offsets 19 and 19'. Consequently sheet 2 will contact contiguously and overlie smoothly both flanges of nose plate 14 at the locations of the ribs 1 as well as between them. Intermediate the ribs such nose plate flanges serve the same purpose as stringers 10 to support the inner wing skin.

It will now be appreciated that it is a simple matter to apply the under sheet 2 to the skeletal framework of the wing formed by ribs 1, stringers 10, and marginal members 11, 13 and 14. Sheet 2 is merely laid over the leading edge skeleton with ridges 20 in proper registry with the flanges 15 of ribs 1. The stringer flanges, nose plate flanges, and sheet 2 will then be drilled appropriately to receive rivets. This sheet may now be held in place by driving spacer rivets 18 through the inner sheet 2, stringers 10, and nose plate flanges. The heads of these rivets will be of a thickness equal to the projection of ridges 20 and the thickness of strips 22.

Figure 5:
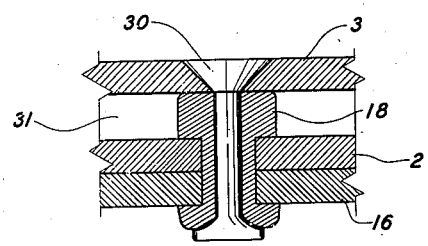
Figure 5 is a similar view illustrating a subsequent stage of the installation.
Figure 4:
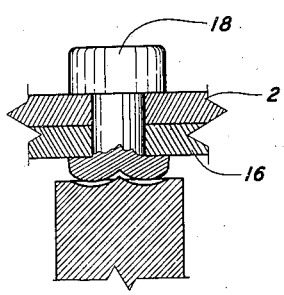
Figure 4 is a detail fragmentary sectional view, showing a preliminary rivet installation.

The structure is now ready for application of strips 22 and the outer sheet or wing skin 3, which is perfectly smooth. Since the heads of rivets 18, ridges 20 the outer surfaces of strips 22, and the marginal projections 23 of sheet 2 all lie in the same curved surface the inner side of skin sheet 3 will engage contiguously and be supported by all these elements. This sheet and the various members beneath it will now be drilled to accommodate rivets for securing them together into an integral structure. The outer sheet will thus be intimately supported along parallel lines conjointly by ridges 20 of sheet 2 and by strips 22 extending between the adjacent ends of the corresponding upper and lower ridges at each rib station. In order to enable the outer sheet to be connected directly to the stringers 10 and to the flanges of nose plate 14 intermediate ribs 1, rivets 18 will be hollow to receive through them a further inner rivet 30 engaged with the skin 3, as shown in Figures 5 and 6. These rivets may either be hollow initially, or may be solid in the first instance, as in Figure 4, and in being riveted to interconnect the sheet 2 and stringer flanges 16 their inner ends may be upset in a manner to form a central depression for centering a drill.

Pins 30 extending through and thereby securing the skin sheet 3 both to sheet 2 and to the skeletal structure beneath it, in the form of rivets as shown, are preferably of the flush type, so that there will be no projection beyond the surface of the skin. Bolts or sheet metal screws could, of course, be used as such pins instead of rivets, but they are not preferred. Since the rivets 30 applied between the locations of ribs 1 extend through the hollow rivets 18, previously applied to secure the sheet 2 to the framework, the skin at these locations will be rigidly connected directly to the flanges 16 of stringers 10. Nevertheless such construction leaves a narrow space of a thickness corresponding to the head thickness of rivets 18 between the under sheet 2 and the skin over the major portion of the stringers as well as between adjacent stringers. The portions of skin 3 which contiguously overlie ridges 20 will be riveted through such ridges and the flanges 15 of rib 1 to form a solid joint including under sheet 2, skin sheet 3 and the rib flanges, as shown best in Figure 3. At the locations where stringers 10 intersect the ribs the rivets 30 will pass not only through sheets 2 and 3, but also through the hollow rivet 18 secured to the stringer flange, instead of passing through the rib flange 15, which is cut away at those particular locations to form the stringer receiving notches.

The nose part of the leading edge forward of the nose plate 14 will be formed simply by riveted interconnection of the sheets 2 and 3 and the spacing strips 22 between them, since no skeleton element is in contact with this portion of sheet 2. The structure is completed by riveting through both sheets 2 and 3, strips 22, the flanges of nose plates 14, and the rib flanges 15 forward of the offset 19' to form a solid joint.

If it should be desired to apply both under sheet 2 and skin sheet 3 to the leading edge framework simultaneously plate 2 may have circular protuberances 24 pressed or drawn in the depressed portions between ridges 20, as shown in Figure 6. These protuberances will project outward to the same height as ridges 20, so that a solid joint may nevertheless be formed between both sheets 2 and 3 and the flanges of stringers 10. Spacer rivets 18 in this instance will be secured only to the stringer flanges instead of also penetrating sheet 2.

Both sheets 2 and 3 may now be applied simultaneously to the wing skeleton in superposed relationship, so that the rivets 30 anchor not only the outer sheet 3 to the stringer flanges, but also the protuberances 24 of sheet 2. Consequently the rivets 30, both at the rib locations and between the ribs, will constitute the entire connection of both sheets to the rib, stringer and nose plate framework.

Whichever construction described above is employed it will be seen that warming spaces 31 are formed between the inner sheet 2 and the skin sheet 3 intermediate the positions of ribs 1. The thickness of this space between the sheets may, of course, readily be varied merely by altering correspondingly the projection of ridges 20, the thickness of strips 22, and the thickness of the spacer heads of rivets 18. It is desired, however, that this space be kept relatively narrow to utilize most efficiently the heat of the exhaust gas admitted to it for heating the skin sheet 3.

In order to convey the exhaust gas or other heating medium to the warming spaces 31 a conduit 4 is connected to the nose plate 14. Several of these conduits at various locations along the nose plate are desirable, although one between each pair of adjacent ribs is not necessary. Access holes in the nose plate, provided to facilitate riveting forward of such plate during fabrication of the wing, may be utilized for connection of the conduits 4.

The space between the nose plate 14 and the extreme leading edge of the wing is unobstructed spanwise of the wing, and constitutes a header for distribution of the exhaust gas along the wing span. From this header space the exhaust gas can pass through inlet apertures 25 in the foremost portion of the under sheet 2 to flow both upward and downward through the space 31 between sheets 2 and 3. The hottest gas will thus come in contact with the nose of the wing's leading portion where ice has the greatest tendency to form. As the exhaust gas flows rearwardly, therefore, its heat is transferred progressively to the wing skin 3, until it is discharged from the warming spaces through outlet apertures 26 at the upper and lower ends of the warming spaces adjacent to the margins of the leading edge sections.

It will thus be seen that with such structure the heat of the exhaust gas is expended most efficiently, both because it is confined to close proximity to the skin sheet, and also because it is directed first to the portion of the sheet which dissipates most heat in melting or preventing the formation of ice, and is circulated constantly in definite paths throughout the entire leading portion of the wing.

We claim as our invention:

1. A deicing wing structure comprising an under sheet extending around the leading portion of the wing, including a sharply curved section around the wing's leading edge and two adjoining integral relatively slightly curved sections extending from said sharply curved sections rearwardly along opposite sides of the wing, said slightly curved sections being deformed to form a plurality of outwardly projecting ridges and grooves therebeneath extending chordwise of the wing, terminating forwardly adjacent to but rearwardly of said sharply curved section, and spaced apart spanwise of the wing, a plurality of ribs each having a portion of its outer edge received in one of such grooves in said under sheet, a wing skin sheet overlying said under sheet, engaging contiguously said under sheet ridges and bridging the portions of said under sheet therebetween to define warming spaces for reception of a heating medium, and means securing together said wing skin sheet, said under sheet, and said ribs to form elongated solid joints.

2. A deicing wing structure comprising a plurality of ribs extending chordwise of the wing and spaced apart spanwise along the leading portion of the wing, an under sheet including a sharply curved section extending about the leading edge of the wing and engaging contiguously a portion of the edges of said ribs, a plurality of strips engaged with and overlying said under sheet, each of said strips being disposed in registry with one of said ribs and bent to locate its opposite ends overlying, respectively, portions of the opposite edges of such rib, a wing skin sheet overlying said strips and said under sheet and spaced from said under sheet by contiguous engagement with said strips to define warming spaces for reception of a heating medium, and means securing together said wing skin sheet, said strips, said under sheet, and said wing ribs to form elongated solid joints around the wing's leading edge.

3. A deicing wing structure comprising an under sheet extending around the leading portion of the wing and deformed to form a plurality of outwardly projecting ridges and grooves therebeneath extending chordwise of the wing toward the wing nose but terminating at locations spaced from the extreme leading edge of the wing and spaced apart spanwise of the wing, a plurality of ribs each having a portion of its outer edge received in one of such grooves in said under sheet, a plurality of strips engaged with and overlying said under sheet, each of said strips being disposed in registry with one of said ribs and extending between the forward ends of corresponding upper and lower sheet ridges, a wing skin sheet overlying said under sheet engaging contiguously said under sheet ridges and said strips, and bridging the portions of said under sheet therebetween to define warming spaces for reception of a heating medium, and means securing together said wing skin sheet, said strips, said under sheet, and said wing ribs to form elongated solid joints.

4. A deicing wing structure comprising a plurality of ribs extending chordwise of the wing and spaced apart spanwise along the leading portion of the wing, a plurality of stringers extending spanwise of the wing and transversely of said ribs, an under sheet extending about the leading edge of the wing and overlying said ribs and stringers, a wing skin sheet overlying the said under sheet, spacing means disposed in registry with said ribs, respectively, operable to maintain the portions of said under sheet and said wing skin sheet intermediate said ribs in spaced relationship to define warming spaces for reception of a heating medium, additional spacing means interengaged between said stringers and said wing skin sheet, means securing together said wing skin sheet, said first spacing means, said under sheet, and said wing ribs, to form solid joints, and further means securing together said wing skin sheet, said additional spacing means, said under sheet, and said stringers, to form additional solid joints.

5. The deicing wing structure of claim 4, in which the second securing means include hollow rivets directly connecting the under sheet and the stringers, and inner rivets extending through said hollow rivets and securing the wing skin sheet to said hollow rivets, the heads of said hollow rivets forming the additional spacing means.

6. The deicing wing structure of claim 4, in which the additional spacing means is formed by outwardly projecting spacing elements carried by and spaced along the stringers, the under sheet has local protuberances extending over and contiguously engaging said spacing elements, and the second securing means includes rivets each extending through the wing skin sheet, a protuberance of the under sheet, and a stringer.

7. A deicing wing structure comprising a plurality of ribs extending chordwise of the wing and spaced apart spanwise along the leading portion of the wing, a plurality of stringers extending spanwise of the wing and transversely of said ribs, an under sheet extending about the leading edge of the wing and overlying said ribs and stringers, a wing skin sheet overlying the said under sheet, elongated spacing means disposed in registry with said ribs, respectively, operable to maintain the portions of said under sheet and said wing skin sheet intermediate said ribs in spaced relationship to define warming spaces for reception of a heating medium, additional spacing means interengaged between said stringers and said wing skin sheet and spaced apart lengthwise of said stringers to leave space between said wing skin sheet and the major portion of the length of said stringers, means securing together said wing skin sheet, said first spacing means, said under sheet, and said wing ribs, to form elongated solid joints, and further means securing together said wing skin sheet, said additional spacing means, said under sheet, and said stringers, to form additional solid joints.

8. A deicing wing structure comprising an under sheet extending around the leading portion of the wing and deformed to form a plurality of outwardly projecting ridges and grooves therebeneath extending chordwise of the wing and spaced apart spanwise of the wing, a plurality of ribs each having a portion of its outer edge received in one of such grooves in said under sheet, a plurality of stringers extending spanwise of the wing and transversely of said ribs, a wing skin sheet overlying said under sheet, engaging contiguously said under sheet ridges and bridging the portions of said under sheet therebetween to define warming spaces for reception of a heating medium, means securing together said wing skin sheet, said under sheet, and said ribs to form elongated solid joints, spacing means intermediate said ribs, interengaged between said stringers and said wing skin sheet and spaced apart lengthwise of said stringers to leave space between said wing skin sheet and the major portion of the length of said stringers, and means securing together said wing skin sheet, said spacing means, said under sheet and said stringers to form solid joints intermediate such elongated solid joints.

9. A deicing wing structure comprising a plurality of ribs spaced apart spanwise along the leading portion of the wing and extending chordwise thereof but spaced from the extreme leading edge of the wing, a nose plate extending spanwise of the wing and interconnecting the forward ends of said ribs, an under sheet extending about the leading edge of the wing, contiguously engaging the upper and lower edges of said nose plate and overlying said ribs, a wing skin sheet overlying said under sheet, spacing means disposed in registry with said ribs, respectively, operable to maintain the portions of said under sheet and said wing skin sheet intermediate said ribs in spaced relationship to define a plurality of warming spaces for reception of a heating medium, and means securing together said wing skin sheet, said spacing means, said under sheet and said wing ribs to form elongated solid joints, said under sheet having outlet apertures adjacent to both of its rearward edges and inlet apertures forward of said nose plate, and said nose plate and the forward portion of said under sheet constituting a header conduit extending spanwise of the airfoil, communicating with such inlet apertures in said under sheet for supplying a heated gaseous medium through such inlet apertures into the warming spaces for flow rearwardly therethrough and discharge from such spaces through the outlet apertures in such under sheet.

10. A deicing airfoil structure comprising an under sheet, a skin sheet overlying said under sheet, a plurality of generally parallel stringers having their lengths extending spanwise of the wing, disposed immediately underlying said under sheet and in engagement with the inner surface thereof, spacing elements directly overlying said stringers, disposed in spaced relationship therealong, interposed between said under sheet and said skin sheet, and engaging the inner side of said skin sheet and the outer side of said under sheet, and means directly interconnecting each stringer, the portion of said under sheet engaged thereby, the spacing elements directly overlying such stringer, and the portions of said skin sheet engaging such spacing elements while said spacing elements maintain in spaced relationship the portions of said under sheet and said skin sheet intermediate the spacing elements to define warming spaces.

11. A deicing airfoil structure comprising an under sheet, a skin sheet overlying said under sheet, a plurality of elongated framework elements immediately inwardly of said under sheet and in engagement with the inner surface thereof, apertured spacing elements in registry with said framework elements, respectively, each including a head portion interposed between said under sheet and said skin sheet in engagement with the inner side of said skin sheet and the outer side of said under sheet and a stem portion passing through said under sheet and the framework element in registry therewith, and a securing pin extending through the aperture of each spacing element, the framework element in registry therewith, said under sheet and said skin sheet while such spacing element maintains in spaced relationship the portions of said under sheet and said skin sheet adjacent thereto.

12. An airfoil structure comprising an under sheet, a skin sheet overlying said under sheet, a backing element inwardly of said under sheet and in engagement with the inner surface thereof, a hollow rivet including a head portion interposed between said under sheet and said skin sheet in engagement with the inner side of said skin sheet and the outer side of said under sheet and a stem portion passing through and securing together said under sheet and said backing element, and a securing pin received in the hollow of said rivet and passing through said skin sheet and securing together said rivet and said skin sheet.

13. An airfoil structure comprising an under sheet, a skin sheet overlying said under sheet in engagement therewith, a backing element inwardly of and spaced from said under sheet, a hollow rivet including a head portion interposed between said under sheet and said backing element in engagement with the inner side of said under sheet and the outer side of said backing element and a stem portion passing through and secured to said backing element, and a securing pin received in the hollow of said rivet and passing through said skin sheet and said under sheet and securing together said rivet, said under sheet and said skin sheet.

LOUIS H. SMITH.
PERRY A. DODSON.

REFERENCES CITED

The following references are of record in the file of this patent:

UNITED STATES PATENTS

| Number | Name | Date |
| --- | --- | --- |
| 1,164,820 | Kerestury | Dec. 21, 1915 |
| 1,826,048 | Broluska | Oct. 6, 1931 |
| 1,970,565 | Kean | Aug. 21, 1934 |
| 2,050,327 | Howard | Aug. 11, 1936 |
| 2,161,242 | Benson | June 6, 1936 |
| 2,256,393 | Klein | Sept. 16, 1941 |

FOREIGN PATENTS

| Number | Country | Date |
| --- | --- | --- |
| 363,605 | Italy | Oct. 8, 1938 |
| 701,546 | France | Jan. 12, 1931 |